United States Patent [19]

Inuzuka et al.

[11] Patent Number: 5,768,944
[45] Date of Patent: Jun. 23, 1998

[54] VEHICULAR AUTOMATIC TRANSMISSION SHIFT DEVICE

[75] Inventors: Takeshi Inuzuka; Masashi Hattori, both of Aichi-ken; Tsutae Takeda, Fukui-ken; Akihiro Seki, Fukui-ken; Junichi Kurosaki, Fukui-ken; Masahiro Yamaguchi, Fukui-ken; Tamotsu Miyoshi, Fukui-ken, all of Japan

[73] Assignee: Aisin AW Co., Ltd., Anjo, Japan

[21] Appl. No.: 665,705

[22] Filed: Jun. 18, 1996

[30] Foreign Application Priority Data

Jun. 21, 1995 [JP] Japan ..................................... 7-176879
Jul. 3, 1995 [JP] Japan ..................................... 7-187691

[51] Int. Cl.⁶ .................................................. F16H 59/08
[52] U.S. Cl. .............................. 74/473 R; 74/335; 74/475
[58] Field of Search ................................ 74/473 R, 475, 74/335

[56] References Cited

U.S. PATENT DOCUMENTS

| | | |
|---|---|---|
| 4,987,792 | 1/1991 | Mueller et al. . |
| 5,178,042 | 1/1993 | Moroto et al. ......................... 74/473 R |
| 5,249,478 | 10/1993 | Moroto et al. . |
| 5,372,050 | 12/1994 | Shinki et al. . |
| 5,415,056 | 5/1995 | Tabata et al. .............................. 74/335 |
| 5,509,322 | 4/1996 | Anderson et al. ......................... 74/335 |
| 5,622,079 | 4/1997 | Woeste et al. ............................. 74/335 |

FOREIGN PATENT DOCUMENTS

| | | |
|---|---|---|
| A-0 279 087 | 8/1988 | European Pat. Off. . |
| A-0 575 658 | 12/1993 | European Pat. Off. . |
| A-0 589 145 | 3/1994 | European Pat. Off. . |
| A-37 17 675 | 12/1988 | Germany . |
| A-39 23 508 | 1/1991 | Germany . |
| A-7-32902 | 2/1992 | Japan . |
| 4-69446 | 3/1992 | Japan ...................................... 74/335 |
| A-7-35224 | 2/1995 | Japan . |

*Primary Examiner*—Charles A. Marmor
*Assistant Examiner*—Troy Grabow
*Attorney, Agent, or Firm*—Oliff & Berridge, PLC

[57] ABSTRACT

A shift device includes a shift lever with an operating knob provided on the top thereof, a gate plate that defines shift patterns for an automatic shift mode and a manual shift mode, and a first rotational center shaft and a second rotational center shaft for allowing the shift lever to be rotated in a front-to-rear direction and in a right-to-left direction, respectively, in accordance with the shift pattern of the gate plate. The gate plate is disposed apart from the knob of the shift lever, with the rotational center shafts passing between the gate plate and the knob. The length of the shift lever can be reduced so as to achieve a short stroke and a large shift lever pivot angle.

15 Claims, 8 Drawing Sheets

VEHICULAR AUTOMATIC TRANSMISSION SHIFT DEVICE

BACKGROUND OF THE INVENTION

1. Field of the Invention

The invention relates to a vehicular automatic transmission shift device and, more particularly, to a shift device capable of being operated in both the automatic shift mode and the manual shift mode.

2. Description of the Related Art

A known shift device, for vehicular automatic transmissions, comprises both an "I" pattern for the automatic shift mode and an "H" pattern for the manual shift mode. In this shift device, the shift lever has two rotational center shafts so as to allow the shift lever to be pivoted in a front-to-rear direction (hereinafter, referred to simply as "shift direction") and in a right-to-left direction (hereinafter, referred to simply as "select direction"). A gate plate for restricting the motion of the shift lever to the "I" pattern and the "H" pattern is disposed between the rotational center shafts and the knob disposed on the top of the shift lever. The disclosure in U.S. Pat. No. 5,249,478 includes such a shift device.

The above-mentioned shift device allows a driver to select a gear speed in an automatic transmission as the driver desires and, furthermore, provides an operating feel similar to the operating feel of a manually-shifted transmission when the driver shifts the gear speed. Therefore, it is desirable for such a shift device to provide an operating feel equivalent to that of a typical manually-shifted transmission during the manual shift mode and, in particular, to provide an operating motion of the shift lever that enables a driver to operate the lever with a wrist action thereby providing a pleasant shift feel by reducing the stroke of the shift lever and increasing the pivot angle of the shift lever.

Furthermore, the shift device needs to hold the shift lever to a shift position corresponding to a selected speed in the manual shift mode, unlike a shift device such as disclosed in U.S. Pat. No. 4,987,792, wherein the manual shift mode is an up-down type shift. It is also necessary to clearly inform a driver, by the operating feel, that the shift lever is moved to an intended shift position.

To achieve such requirements, the first-mentioned shift device, of U.S. Pat. No. 5,249,478, comprises a detent device between the shift lever and a stationary member (a rocking retainer) of the shift lever. The detent device comprises a detent spring cooperatively connected to the shift lever, and a detent block disposed on the stationary member. As the shift lever is operated in the front-to-rear direction, the spring load changing with the block moving over a cam ridge provides a clicking or restrained operating feel to the driver. The block is then pressed into a cam trough by the spring load and holds the shift lever to the selected shift position.

However, according to the conventional art described above, since the gate plate is disposed between the rotational center shafts and the top of the lever, that is, the operating knob, the shift lever must be made longer to provide a small pivot angle.

To increase the pivot angle relative to the stroke in the above-described arrangement, one may consider disposing the gate plate very close to the rotational center shafts and reducing the length of the shift lever. However, the space between the rotational center shafts and the gate plate cannot be significantly reduced since a certain space is required therebetween for disposal of other associated mechanisms.

In addition, since the above-described arrangement has a large shift lever ratio, that is, a ratio between the distance between the rotational center shafts and the gate plate and the distance between the rotational center shafts and the knob disposed on the top of the lever, the force applied from the shift lever to the gate plate during a shift lever operation become large in accordance with the lever ratio. A projected portion of the "H" pattern of the gate plate receives a large force when a shift motion and a select motion are consecutively performed, for example, during a second-to-third shift lever operation. According to the conventional art, the projected portion is provided with an increased width to achieve sufficient strength. Such structure also increases the stroke of the knob of the shift lever, particularly, in the select direction.

Further, the conventional shift device comprises an inhibiting mechanism whose operating part extends inside the shift lever for a range select operation in the automatic shift mode. Because the operating part of the inhibiting mechanism extends within the shift lever, the shift lever requires a certain diameter. Thus, the gate slit of the "H" pattern, through which the shift lever extends and is thereby guided, needs have a width in accordance with the diameter of the shift lever. This results in size increases of the "H" pattern, causing an increased stroke of the knob in the select direction.

Conventional vehicular automatic transmission shift devices, having an "H" pattern for the manual shift mode, are intended to produce an operating feel as found in typical manually-shifted transmissions. It is therefore desired for such a shift device to provide an operating feel substantially the same as those of comparable operating devices of manually-shifted transmissions. However, since the above-described shift device needs to comprise a block having a recess for holding the shift lever to a selected shift position when the shift lever is moved to that position, it is difficult for the detent mechanism to produce a special viscous, fluid-like resisting feel that is contrary to, but desirably precedes, the occurrence of a definite clicking feel although manually-shifted transmissions normally produce such a resisting feel. Thus, the shift feel of the conventional vehicular automatic transmission shift devices in the manual shift mode is not satisfactory.

SUMMARY OF THE INVENTION

Accordingly, a first and main object of the invention is to improve the shift feel in the manual shift mode of a vehicular automatic transmission shift device capable of being operated in an automatic shift mode and a manual shift mode.

It has been established that the shift feel in manual shift lever operation with the "H" pattern is improved when the stroke in the shift direction is shorter than the stroke in the select direction. Accordingly, a second object of the invention to further improve the shift feel by allowing the stroke in the select direction in the manual shift mode to be reduced to a greater extent than the stroke in the shift direction.

A third object of the invention is to increase the strength of the gate plate without causing increases in the weight and the number of component parts required.

A fourth object of the invention is to achieve shift operations with reduced play by precisely establishing a positional relationship between the shift lever and the gate plate with reference to a single strength member, during assembly of the shift device, without requiring special adjustment.

A fifth object of the invention is to avoid increases in the weight and the number of component parts while achieving a sufficient rigidity of the above-mentioned strength member.

A sixth object of the invention is to reduce the weight and the number of component parts of the shift device by simplifying the structure and optimizing the position of the inhibiting mechanism that is operated during the automatic shift mode.

A seventh object of the invention is to reduce the weight and the number of component parts of the shift device by simplifying the inhibiting mechanism, more specifically, by disposing the shift lever closer to the strength member so that a direct inhibiting operation can be achieved between the shift lever and the strength member.

According to the conventional art, where the shift lever extends through the gate plate, the need to provide an inhibiting mechanism inside the shaft of the shift lever, as in a normal automatic transmission apparatus, prevents a significant reduction in the diameter of the shift lever. This precludes a significant reduction in the width of the gate of the gate plate through which the shift lever is inserted and results in an undesirably long stroke in the right-to-left direction, thus failing to provide a good shift feel during the manual shift mode. Accordingly, an eighth object of the invention is to improve the shift feel by reducing the gate width of the gate plate in order to reduce the stroke in the select direction of the manual shift mode.

A ninth object of the invention is to provide a vehicular automatic transmission shift device that produces two opposite types of operating feel, that is, a defined clicking or restrained feel and a viscous fluid-like resisting feel, during shift operation in the manual shift mode.

A tenth object of the invention is to provide a vehicular automatic transmission shift device that has a simple structure while achieving the viscous fluid-like resisting feel.

An eleventh object of the invention is to provide a vehicular automatic transmission shift device that has an enhanced durability of the mechanism for producing the viscous fluid-like resisting feel and thereby maintains the desirable operating feel for a long time.

The shift device, capable of operating in the automatic and manual shift modes, should avoid producing the viscous fluid-like resisting feel in the automatic shift mode since the viscous fluid-like resisting feel would degrade the operating feel in that mode. Accordingly, a twelfth object of the invention is to provide a vehicular automatic transmission shift device that changes the shift lever operating feel in accordance with the selected shift mode without a failure.

To achieve the above objects, according to one aspect of the invention, there is provided a vehicular automatic transmission shift device comprising a shift lever having an operating knob provided on a top portion of the shift lever; a gate plate that defines a shift pattern for an automatic transmission mode and for a manual transmission mode; and a first rotational center shaft and a second rotational center shaft for allowing the shift lever to be rotated in a front-to-rear direction and rotated in a right-to-left direction, respectively, in accordance with the shift pattern of the gate plate. The gate plate is disposed apart from the knob of the shift lever, with the first and second rotational center shafts passing between the gate plate and the knob.

In a more advantageous feature, the second rotational center shaft is closer to the knob than is the first rotational center shaft.

In another feature, the shift device may further comprise a stationary member mounted on a vehicle body, and the gate plate may be fixed to the stationary member and at least partially reinforced by the stationary member that serves as a core.

In a further feature, the shift device may further comprise first and second side plates that bear the first rotational center shaft, with the first side plate having a greater strength than the second side plate.

Still further, the first side plate may have a reinforcing rib. Yet further, the shift lever may have a pin of an inhibiting mechanism, and the first side plate may have a cam of the inhibiting mechanism.

Furthermore, the shift device may further comprise a cross joint supported so as to be freely rotatable around the first and second rotational center shafts, and a retainer that is rotatable together with the cross joint around the first rotational center shaft and rotatable around the second rotational center shaft independently of the cross joint, and the shift lever may be disposed contiguous to the first side plate and connected to the retainer.

Further, the gate plate may be disposed below the pin of the inhibiting mechanism.

The shift device may comprise a front-to-rear detent mechanism for holding the shift lever to the shift position that corresponds to a selected one of the speeds in accordance with rotation of the shift lever around the first rotational center shaft; and resisting means for producing sliding resistance against rotation of the shift lever around the first rotational center shaft.

In another feature, the front-to-rear detent mechanism comprises a cam rotatably supported around the first rotational center shaft and capable of rotating cooperatively with the shift lever, when the manual shift mode is selected, and a spring supported by a stationary member of the shift device and elastically contacting the cam. In this embodiment, the resisting means comprises at least one wave washer pressed against at least one end of the cam.

In another preferred feature, the resisting means comprises quenched flat washers sandwiching the cam with the wave washer disposed between the cam and the quenched flat washers.

In a further preferred feature, the shift device further comprises first and second side plates having shaft bearings for the first rotational center shaft and two collars disposed on the first rotational center shaft. One of the two collars has a flange and the two collars are disposed between the pair of side plates with the flange being located close to the other collar. The front-to-rear detent mechanism and the resisting means are disposed on the first rotational center shaft and outwardly from the pair of side plates. One of the collars rotatably supports a connecting mechanism for connecting to a manual valve of the automatic transmission, and the other one of the collars rotatably supports a connecting means for cooperating with rotation of the shift lever around the first rotational center shaft at all times, connecting with the connecting mechanism when the automatic shift mode is selected, and connecting with the front-to-rear detent mechanism when the manual shift mode is selected.

In another feature, the shift device comprises a retainer, that cooperates with rotation of the shift lever around the first rotational center shaft and rotation of the shift lever around the second rotational center shaft; a cross joint, that operates together with the retainer in cooperation with rotation of the shift lever around the first rotational center shaft and that does not cooperate with rotation of the shift lever around the second rotational center shaft; a right-to-left detent mechanism, having a cam and a plunger portion associated with the cam, for positioning the shift lever in a right-to-left direction in accordance with rotation of the shift lever around the second rotational center shaft; and a switch mechanism, having a switch and an operating portion, for detecting the position of the shift lever in accordance with the rotation of the shift lever around the second rotational center shaft. A first one of the cam and the plunger portion and a first one of the switch and the operating portion, being integrally provided or unitarily formed, disposed on a first one of the retainer and the cross joint. The second one of the cam and the plunger portion and the second one of the switch and the operating portion, being integrally provided or unitarily formed, disposed on the second one of the retainer and the cross joint.

In a still another feature, the shift device further comprises an "I" pattern for setting select positions corresponding to a plurality of ranges in the automatic shift mode, and an "H" pattern, provided adjacent to and connected to the "I" pattern, for setting shift positions corresponding to a plurality of speeds in the manual shift mode. The right-to-left detent mechanism defines a position for switching over the "I" pattern and the "H" pattern, and neutral-returns the shift lever to a predetermined position when the shift lever is in the "H" pattern. The switch mechanism detecting the position of the shift lever in the "I" pattern and a right hand-side position and a left hand-side position of the shift lever in the "H" pattern.

In another feature, the retainer has a "U" shape, and the cross joint, the switch mechanism and the right-to-left detent mechanism are disposed inside of the retainer.

In another feature, the cam and the switch are integrally provided or unitarily formed. The cam and the switch are disposed on an inside bottom surface and an inside side surface, respectively, of the retainer. The plunger portion and the operating portion are integrally provided or unitarily formed with the plunger portion and the operating portion disposed in a lower portion and a central portion, respectively, of the cross joint. The switch has a pin that slides in cooperation with the operating portion in accordance with rotation of the shift lever around the second rotational center shaft.

Since the knob and the gate plate are disposed at opposite sides of the two rotational center shafts, the shift lever length can be shortened so as to allow for short-stroke and large-pivot-angle shift lever operation during the manual shift mode. Furthermore, because the structure enables reduction of the lever ratio, thereby reducing the force applied to the gate plate, the width of the projected portions of the "H" pattern can be smaller than the width of the projected portions of the conventional art to achieve the strength required by that art. Thus, the stroke in the select direction can be reduced and the shift feel in the manual shift mode is improved.

With the structure wherein the second rotational center shaft is provided above the first rotational center shaft, it is possible to reduce the stroke in the select direction with a higher priority over the reduction of the stroke in the shift direction. Thus, the shift feel can be further improved.

With the structure wherein the gate plate is reinforced by using the stationary member as a core, it is not necessary to separately provide a member for reinforcing the gate plate. Thus, the weight and the number of component parts of the shift device can be reduced.

With the structure wherein one of the two side plates bearing the first rotational center shaft has a greater strength than the second side plate so that the first side plate serves as a strength member, it is possible to establish and maintain the positional relationship between the shift lever and the gate plate with a high precision by precisely positioning the first rotational center shaft with reference to the first side plate while deforming the second side plate having the lesser strength. This step eliminates looseness in the operation of the shift lever.

With the structure wherein the rib is provided to increase the rigidity of the first side plate serving as a strength member, it is possible to avoid a weight increase of the shift device despite the rigidity increase and to avoid an increase in the number of component parts.

With the structure wherein the cam of the inhibiting mechanism is formed in the strengthened first side plate, there is no need to separately provide a cam for the inhibiting mechanism. Thus, this structure enables a reduction in the weight and the number of component parts of the shift device.

With the structure wherein the shift lever is connected to the second rotational shaft with an offset therefrom and disposed closer to the side plate of the inhibiting mechanism, there is no need to provide a transmitting member between the inhibiting cam and the inhibit pin. Thus, the weight and the number of component parts can be reduced.

With the structure wherein the gate plate is disposed below the pin of the inhibiting mechanism, the diameter of the gate pin to be inserted through the gate plate can be reduced. Accordingly, the width of the gate through which the gate pin is inserted can be reduced, allowing a size reduction in the shift pattern. Therefore, it is possible to reduce the shift lever stroke for an improvement in the shift feel.

With the structure of the invention, the front-to-rear detent mechanism holds the shift lever to the shift position corresponding to a selected one of the speeds when the manual shift mode is selected. In addition, the front-to-rear detent mechanism produces a definite clicking or restrained feel during the shift operation. Furthermore, the resisting means produces sliding resistance against the rotation of the shift lever around the first rotational center shaft, thus providing the viscous fluid-like resisting feel during the shift operation. The shift device of the invention thus produces shift feels substantially the same as those of manually-shifted transmissions.

With the structure wherein the wave washer is pressed against at least one of the ends of the cam on the first rotational center shaft, a sliding resistance is produced between the wave washer and the cam cooperating with the shift lever. More specifically, the wave washer is deformed by clamping on the axis, and the deformation produces an urging force which produces an appropriate sliding resistance. The magnitude of the sliding resistance can be adjusted to produce a viscous fluid-like resisting feel as desired by controlling the deformation stroke of the wave washer along the first rotational center shaft using a suitable restricting member. A simple flat washer will not produce a viscous, fluid-like resisting feel such as that produced by the wave washer as the flat washer is not compressible and, therefore, produces no such urging force.

With the structure wherein the wave washer is disposed between the cam and a quenched flat washer, the shift device prevents abrasion due to sliding between the wave washer and the quenched flat washer, and thereby reduces sliding friction changes over time.

The shift device of the invention is capable of operating in the automatic shift mode and the manual shift mode, and enables selection of a plurality of ranges in the automatic shift mode and a plurality of speeds in the manual shift mode in accordance with rotation of the shift lever around the first rotational center shaft. However, such a shift device may have problems in that the clicking feel or the viscous, fluid-like resisting feel produced in the manual shift mode is also produced when the shift lever is operated to select a range in the automatic shift mode. Conversely, there may be problems in that the connecting mechanism for switching over the manual valve is operated when the shift lever is operated to select a speed in the manual shift mode.

To avoid the problems, it is necessary to completely separate the parts cooperative with the shift lever, the manual valve connecting mechanism that operates in the automatic shift mode, and the front-to-rear detent mechanism that operates in the manual shift mode from each other when they are disposed on the first rotational center shaft. One feature comprises the two collars disposed on the first rotational center shaft, one of which has a flange, and the two side plates sandwiching the collars and having shaft bearings for the first rotational center shaft. The connecting means that operates in the automatic shift mode is disposed on one of the collars. The connecting means constantly cooperative with the shift lever is disposed on the other collar. The front-to-rear detent mechanism that operates in the manual shift mode is disposed outwardly from the side plates. With this structure, when the manual shift mode is selected, the connecting mechanism cooperates with the shift lever, but the front-to-rear detent mechanism does not operate since the sliding friction on the first rotational center shaft is shut off by the side plates. Thus, the clicking feel or viscous, fluid-like resisting feel that is produced during the manual shift mode is not produced. Conversely, when the manual shift mode is selected, the front-to-rear detent mechanism cooperates with the shift lever to produce the clicking feel and the viscous fluid-like resisting feel, but the connecting mechanism does not operate so that the manual valve is fixed since the sliding friction on the first rotational center shaft is shut off by the flange of the collar. Thus, the simple structure comprising the two side plates having shaft bearings and the two collars separates the operation in the automatic shift mode from the operation in the manual shift mode without a failure. In addition, the two collars enables precise controlling of the axial length of the rotational center shaft.

In the invention, the plunger portion and the cam of the right-to-left detent mechanism are used to switch over the automatic shift mode and the manual shift mode of the shift lever operation, and the switch mechanism detects the position of the shift lever in the right-to-left direction. In addition, the cam of the right-to-left detent mechanism and the switch of the switch mechanism, and the plunger of the right-to-left detent mechanism and the operating portion of the switch mechanism are integrally provided or unitarily formed. Since no assembly allowance occurs between these elements, the detection precision of the switch can be improved and the step of adjusting the switch can be omitted. Furthermore, because no additional parts are required for assembly of these elements, the number of component parts can be reduced.

With the structure wherein the cam and the plunger portion of the right-to-left detent mechanism returns the shift lever to a neutral position in the "H" pattern during the manual shift mode. No additional mechanism for neutral-return of the shift lever is required, thus enabling a compact structure for the device and a reduction in the number of component parts. The switch mechanism needs to detect three different positions of the shift lever in the right-to-left direction. Because the right-to-left detent mechanism and the neutral return mechanism are integrated, the precision in the positional relationships among the three positions is enhanced, so that the switch detecting range to be set can be reduced. Thus, the precision in detection of the position of the shift lever in the right-to-left direction can be improved.

With the structure wherein the retainer has a "U" shape and the cross joint, the switch mechanism and the right-to-left detent mechanism are disposed inside the retainer, a compact structure for the shift device can be achieved.

With the structure wherein the cam and the switch are unitary, the shift device can be further simplified and reduced in size. In addition, since a slide type switch is employed, the switch mechanism can also be simplified and reduced in size.

BRIEF DESCRIPTION OF THE DRAWINGS

The foregoing and further objects, features and advantages of the invention will become apparent from the following description of preferred embodiments with reference to the accompanying drawings, wherein.

DETAILED DESCRIPTION OF PREFERRED EMBODIMENTS

Figure 1:
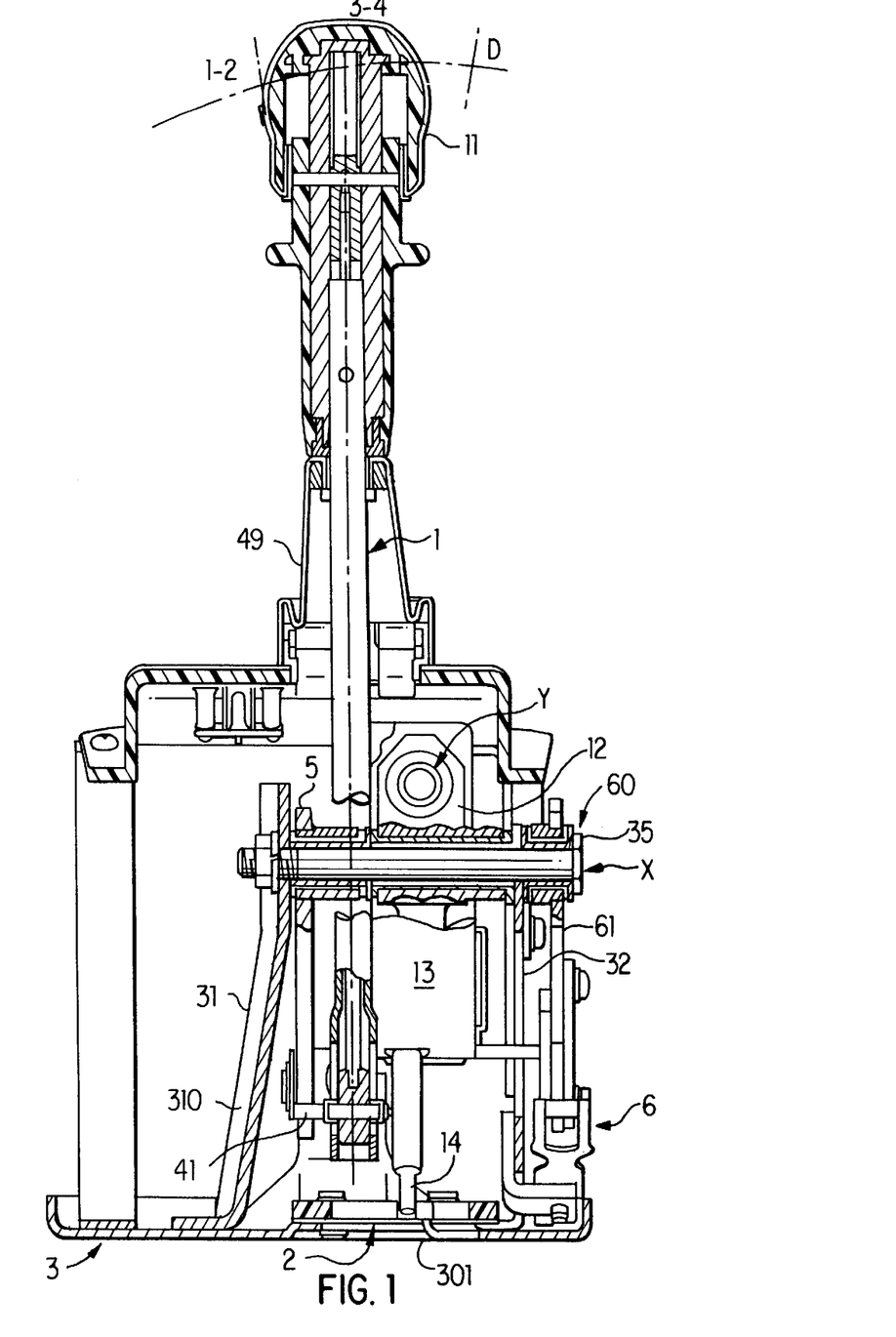
FIG. 1 is a rear, sectional view of the structure of an embodiment of the automatic transmission shift device of the invention.
Figure 2:
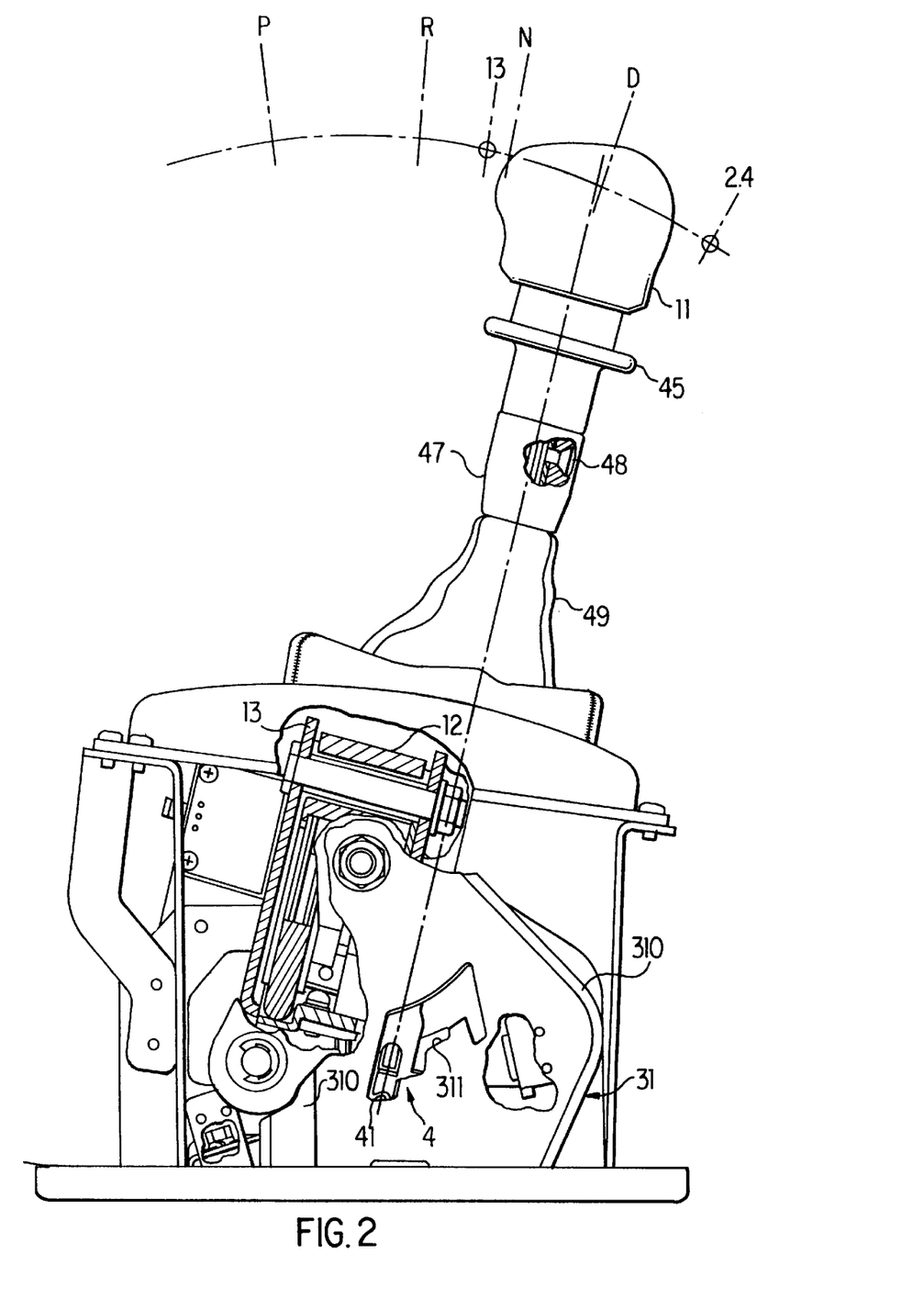
FIG. 2 is a left side, partial sectional view of the structure of the embodiment.
Figure 3:
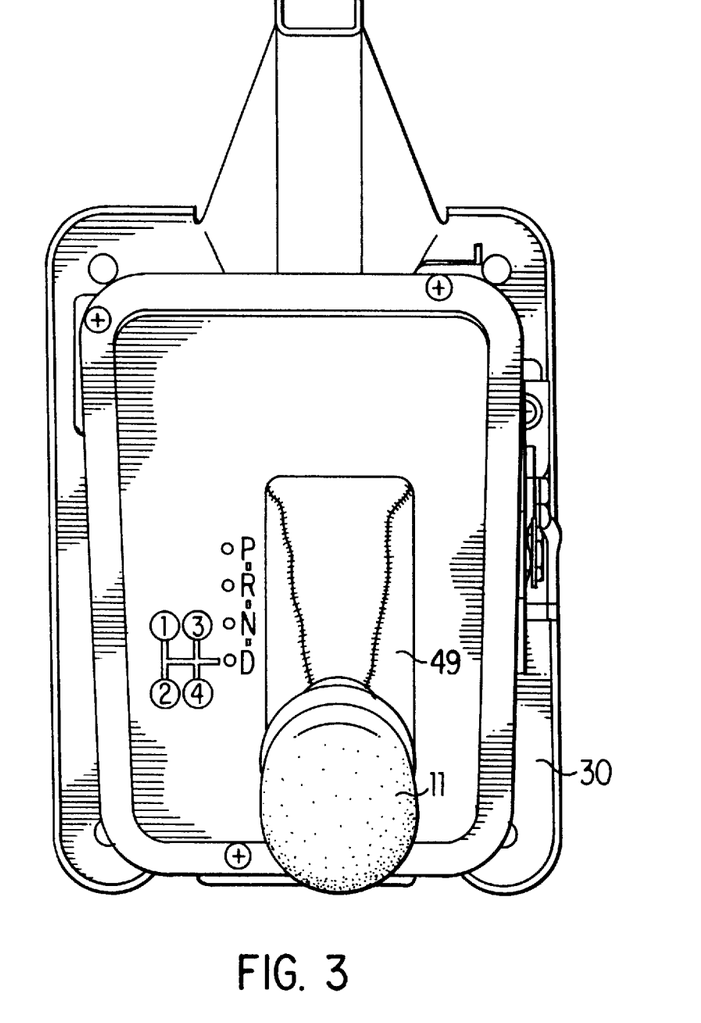
FIG. 3 is a plan view of the embodiment.

An embodiment of the invention will be described with reference to the accompanying drawings. FIGS. 1 to 3 show the overall structure of an embodiment of the invention. FIGS. 4 to 9 show partial structures thereof. In the following description of embodiments, positional expressions, such as front, rear, right, left, above or below, are used to merely describe relative positional relationships in the shift device, and do not limit the positioning of the shift device in a vehicle.

The overall structure will be described with reference to FIG. 1. The shift device comprises a shift lever 1 having an operating knob 11, a gate plate 2 that defines shift patterns for the automatic shift mode and the manual shift mode, and a first rotational center shaft (hereinafter, referred to as the "right-to-left shaft" in the description of the embodiment) X for allowing the shift lever 1 to be rotated in a front-to-rear direction and a second rotational center shaft (hereinafter, referred to as "front-to-rear shaft" in the description of the embodiment) Y for allowing the shift lever 1 to be rotated in a right-to-left direction. The rotation of the shift lever 1 around the front-to-rear shaft Y changes over between automatic and manual shift modes. The rotation of the shift lever 1 around the right-to-left shaft X enables the selection of a plurality of ranges ("P", "R", "N" and "D" ranges) in the automatic shift mode arranged in an "I" pattern and a plurality of speeds (the first to fourth speeds) in the manual shift mode arranged in an "H" pattern.

According to the invention, the gate plate 2 is disposed apart from the knob 11 of the shift lever 1, with the first and second rotational center shafts X, Y passing between the gate plate 2 and the knob 11. The front-to-rear shaft Y is closer to the knob 11 than the right-to-left shaft X is to the knob 11.

The shift device comprises a stationary member 3 mounted on a vehicle body (not shown), and the gate plate 2 is fixed to the stationary member 3 and is at least partially reinforced by the stationary member 3 that serves as a core, in a manner described later. The shift device comprises first and second side plates 31, 32 that bear the right-to-left shaft X. The first side plate 31 (the left side plate in FIG. 1) has a greater strength than the second side plate 32 (the right side plate in FIG. 1). More specifically, the first side plate 31 has a reinforcing rib 310.

The shift lever 1 has a pin 41 of an inhibiting mechanism 4 (see FIG. 2) which inhibits shifts to non-intentional ranges when a range select operation is performed during the automatic shift mode, for example, it inhibits a shift from the "P" range to the "R" range, or from the "N" range to the "R" range. The first side plate 31 has a cam 311 of the inhibiting mechanism 4. The shift device comprises a cross joint 12 supported so as to be freely rotatable around the first and second rotational center shafts X, Y, and a retainer 13 that is rotatable together with the cross joint 12 around the right-to-left shaft X and rotatable around the front-to-rear shaft Y independently of the cross joint 12. The shift lever 1 is disposed contiguous to the first side plate 31 and connected to the retainer 13.

The shift lever 1 has a gate pin 14 that is inserted in the gate of the gate plate 2 and disposed below the pin 41 of the inhibiting mechanism 4. The shaft diameter of the gate pin 14 is smaller than the shaft diameter of the shift lever 1.

The shift device comprises a front-to-rear detent mechanism 6 for holding the shift lever 1 to the shift position corresponding to a selected one of the speeds (the first to fourth speeds) in accordance with rotation of the shift lever 1 around the right-to-left shaft X while the manual shift mode is selected; and resisting means 60 for producing sliding resistance against rotation of the shift lever 1 around the right-to-left shaft X.

Figure 5:
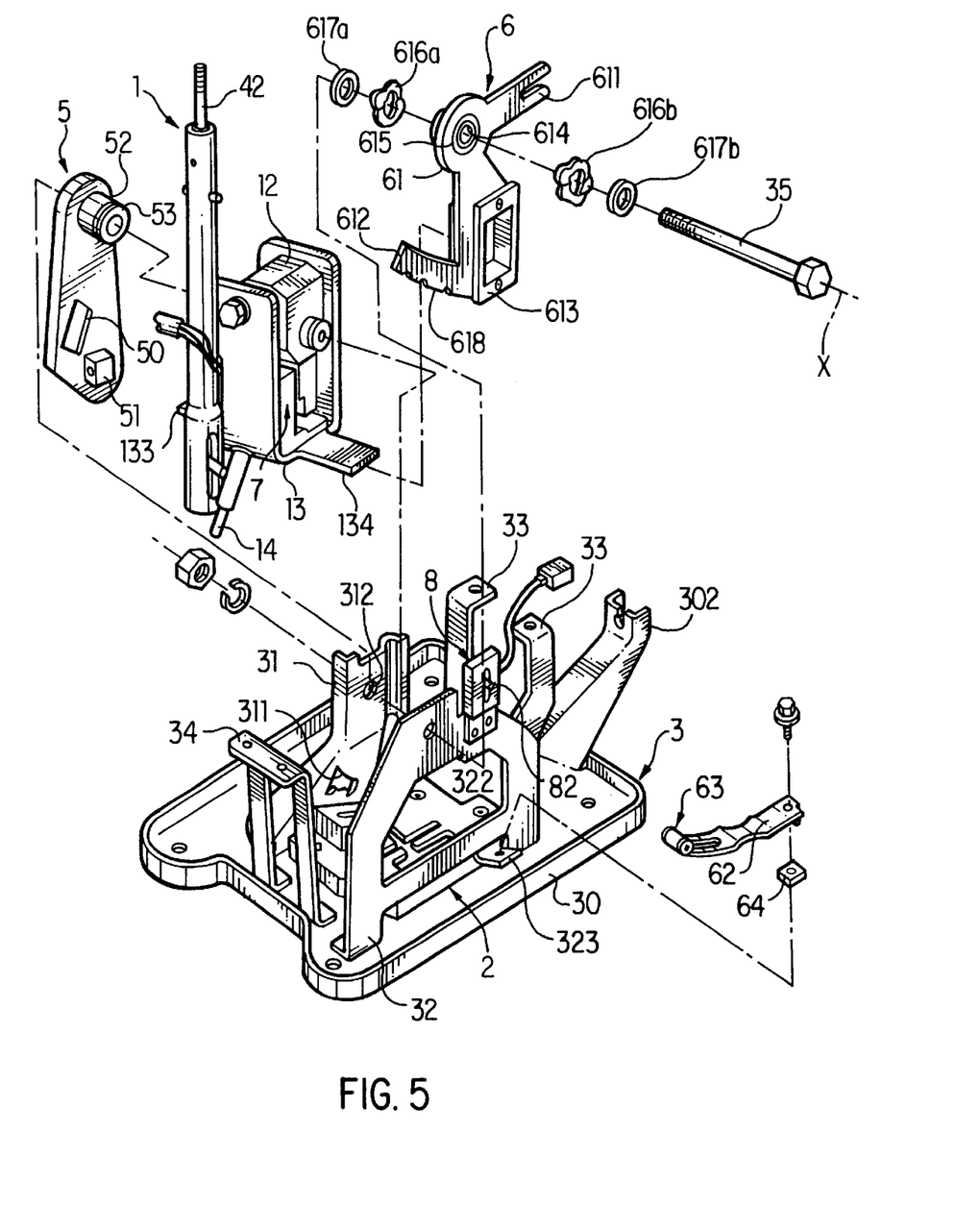
FIG. 5 is an exploded, perspective view illustrating stationary members and the arrangement of various component parts relative to the stationary members according to the embodiment.
Figure 6:
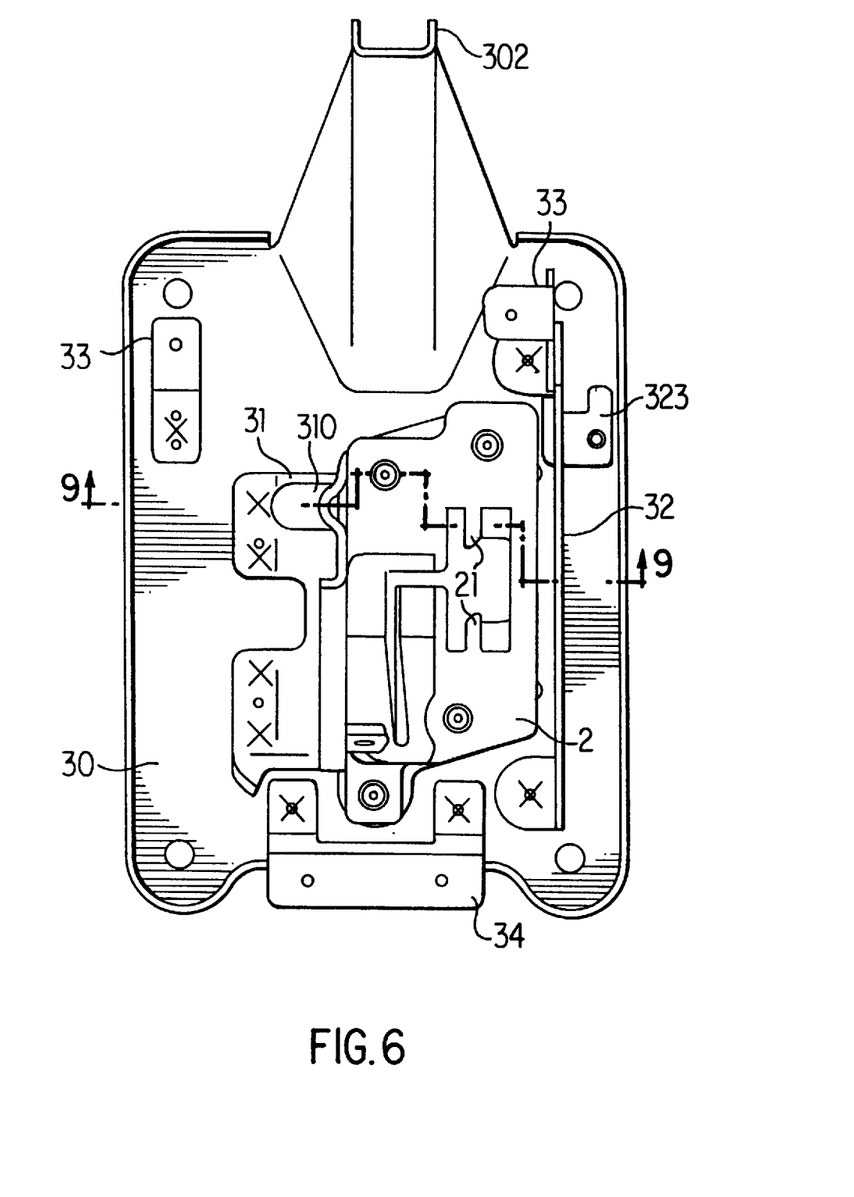
FIG. 6 is a plan view illustrating a gate plate according to the embodiment.

As illustrated in detail in FIG. 5, the front-to-rear detent mechanism 6 comprises a cam 618 rotatably supported around the right-to-left shaft X and capable of rotating cooperatively with the shift lever 1 while the manual shift mode is selected, and a spring 62 supported by the stationary member 3 of the shift device and elastically contacting the cam 618. The resisting means 60 comprises wave washers 616a, 616b pressed against the opposite ends of the cam 618, and quenched flat washers 617a, 617b pressed against the outer ends of the wave washers 616a, 616b sandwiching the cam 618.

The shift device further comprises the first and second side plates 31, 32 having shaft bearings for the right-to-left shaft X, and two collars 53, 126 disposed on the right-to-left shaft X. One of the two collars has a flange 531, and the two collars 53, 126 are disposed between the pair of side plates 31, 32 with the flange 531 being located close to the other collar 126, as illustrated in detail in FIG. 7. The front-to-rear detent mechanism 6 and the resisting means 60, comprising flat washers 617a, 617b and wave washers 616a, 616b, are disposed on the right-to-left shaft X and outwardly from the side plates 31, 32, as shown in FIG. 5. One of the collars 53 rotatably supports a connecting mechanism 5 for connecting to a manual valve (not shown) of the automatic transmission. The other one of the collars 126 rotatably supports a connecting means (12,13,133,134) for cooperating with rotation of the shift lever 1 around the right-to-left shaft X at all times, connecting with the connecting mechanism 5 when the automatic shift mode is selected, and connecting with the front-to-rear detent mechanism 6 when the manual shift mode is selected.

The shift device further comprises a retainer 13 for cooperating with rotation of the shift lever 1 around the right-to-left shaft X and the front-to-rear shaft Y, the cross joint 12 for operating together with the retainer 13 in cooperation with the rotation of the shift lever 1 around the right-to-left shaft X but for not cooperating with the rotation of the shift lever 1 around the front-to-rear shaft Y, a detent mechanism for defining the position of the shift lever 1 in the right-to-left direction in accordance with rotation of the shift lever 1 around the front-to-rear shaft Y, and a switch mechanism 7 for detecting the position of the shift lever 1 in the right-to-left direction in accordance with rotation of the shift lever 1 around the front-to-rear shaft Y.

Figure 4:
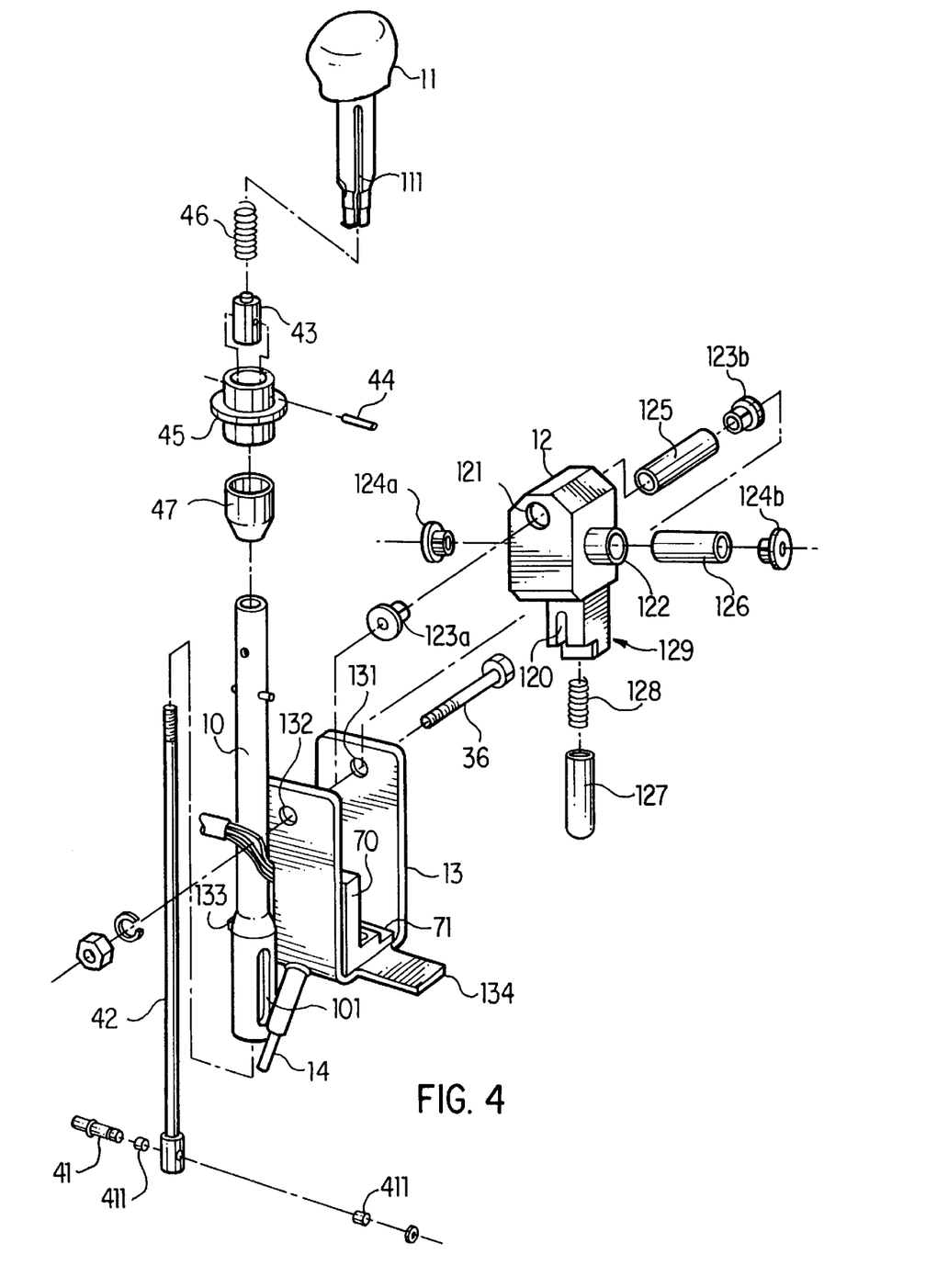
FIG. 4 is an exploded, perspective view of a shift lever and its associated mechanisms according to the embodiment.

The right-to-left detent mechanism comprises a cam 71 and a plunger portion 129 associated with the cam 71, as shown in FIG. 4. The switch mechanism 7 comprises a switch 70 and the operating portion 120. One of the cam 71 and the plunger portion 129 (the cam 71 according to this embodiment) and one of the switch 70 and the operating portion 120 (the switch 70 according to the embodiment) are integrally provided or unitarily formed, and are disposed on one of the retainer 13 and the cross joint 12 (the retainer 13 according to the embodiment). The other one of the cam 71 and the plunger portion 129 (the plunger portion 129 according to the embodiment) and the other one of the switch 70 and the operating portion 120 (the operating portion 120 according to the embodiment) are integrally provided or unitarily formed, and are disposed on the other one of the retainer 13 and the cross joint 12 (the cross joint 12 according to the embodiment).

The right-to-left detent mechanism defines the position for switching over the "I" pattern and the "H" pattern, and neutral-returns the shift lever 1 to a predetermined position (an intermediate position in the third and fourth speed slot) when the shift lever is in the "H" pattern. The switch mechanism 7 detecting the position of the shift lever 1 in the "I" pattern (that is, the automatic shift mode slot in which the various range positions are distributed), and a left hand-side position (the first and second speed slot position) and a right hand-side position (the third and fourth speed slot position) of the shift lever 1 in the "H" pattern.

The retainer 13 has a "U" shape, and the cross joint 12, the switch mechanism 7 and the right-to-left detent mechanism are disposed inside the retainer 13, as shown in FIG. 4.

The cam 71 and the switch 70 are integrally provided or unitarily formed, and the cam 71 and the switch 70 are disposed on an inside bottom surface and an inside side surface, respectively, of the retainer 13. The plunger portion 129 and the operating portion 120 are integrally provided or unitarily formed, and the plunger portion 129 and the operating portion 120 are disposed in a lower portion and a central portion, respectively, of the cross joint 12. The switch 70 has a pin 72 (see FIG. 8) that slides in cooperation with the operating portion 120 in accordance with rotation of the shift lever 1 around the front-to-rear shaft Y.

The structure will be further described in detail. The shift lever 1 is composed of a hollow stem 10 whose lower portion has a slightly increased diameter, and a knob assembly 11 mounted on a top portion of the stem 10, and the channel-shape retainer 13 into which the gate pin 14 is planted, as illustrated in an exploded view of FIG. 4. A rod 42 of the inhibiting mechanism 4 is inserted through the hollow portion of the stem 10. A block for supporting the pin 41 of the inhibiting mechanism 4 is fixed to the lower end of the rod 42. The pin 41 is inserted in a pair of vertical elongated holes 101 formed in the large diameter portion of the stem 10, and the right and left ends of the pin 41 protrudes therefrom. A pair of rollers 411, fitted on the outer peripheral surface of the pin 41, are guided by and vertically movable within the elongated holes 101. The outer peripheral surface of an upper end portion of the rod 42 is threaded. A knob sleeve 43 having an inner peripheral thread is screwed onto the threaded portion of the rod 42. The knob assembly 11 is fitted onto the outer peripheral surface of an upper end portion of the stem 10 and fastened thereto by a pair of screws 48 (see FIG. 2). A lower tube portion of the knob assembly 11 has slit grooves 111 that vertically extend and are open to the bottom end thereof. A connecting pin 44 fitted into an upper portion of the knob sleeve 43 extends outwards through the slit grooves 111. The protruding ends of the connecting pin 44 are fitted into a flanged lock ring 45. A compressed coil spring 46 is disposed between the top portion of the knob sleeve 43 and the inside surface of knob 11. The restoration force of the spring 46 presses the lock ring 45 and the rod 42 downwards, so that the inhibit pin 41 is pressed against a surface of an inhibit cam 311 (see FIG. 2) during the automatic shift mode. As shown in FIG. 4, a knob stopper 47 is fitted onto the outer peripheral surface of an extension of the knob 11 so as to cover the screws 48, and restrains the stroke of the lock ring 45.

The retainer 13 is a "U"-shaped member, that is, a channel-shape member that is open to the top and the right and left sides. The rear vertical wall of the retainer 13 slightly extends or protrudes to the left, and the extension is welded to the stem 10 of the shift lever 1. The bottom wall of the retainer 13 extends and protrudes to the right and left. A narrow plate-shape protrusion 133 of the bottom wall protruding to the left forms means for engaging with a shift cable lever 5 (described later) that constitutes a connecting mechanism. A wide plate-shape protrusion 134 protruding to the right forms means for engaging with a detent lever 61 of a front-to-rear detent mechanism 6 for the shift operation of the shift lever 1 during the manual shift mode as described later. The front and rear vertical walls of the retainer 13 have shaft bearing holes 131,132 formed in upper portions thereof and aligned with the front-to-rear shaft Y.

The block-shape cross joint 12 is disposed inside the retainer 13. The joint 12 has a shaft bearing hole 121 extending through an upper portion thereof in the front-to-rear direction for the front-to-rear shaft Y, and a shaft bearing hole 122 extending through a lower portion thereof in the right-to-left direction for the right-to-left shaft X. Bushes 123a, 123b, 124a, 124b are fitted into the opposite ends of the shaft bearing holes 121,122 of the cross joint 12. A collar 125 is fitted into the bushes 123a, 123b, and a collar 126 is fitted into the bushes 124a, 124b. Extending downward from a front portion of the cross joint 12 is a plunger portion 129 of the right-to-left detent mechanism for the select operation in the manual shift mode. A detent piston 127 is disposed in the receiving portion freely movably in a vertical direction, with a compressed coil spring 128 applying a projecting load to the piston 127. A detent cam 71 that cooperates with the detent piston 127 is unitarily or integrally provided together with a select detecting switch 70. The switch 70 is fixed to an inside forward portion of the retainer 13. These component parts serve as the right-to-left detent mechanism for providing a clicking or restrained motion of the shift lever 1 and defining the position of the shift lever 1 when the shift lever 1 is operated to switch between the automatic shift and the manual shift modes and, in addition, to serve as a neutral return mechanism for returning the shift lever 1 to the neutral position in the manual shift mode. The function of these component parts will be described in detail later.

The stationary member 3 for supporting the shift lever 1 and mechanisms associated with shift lever 1 comprises a dish-shape base plate 30, and right and left side plates 31, 32 welded to the top surface of the base plate 30, and front and rear cover plate-mounting arms 33, 34 also welded to the top surface of the base plate 30, as shown in FIG. 5. The side plates 31,32 are provided basically as bearings for rotatably supporting the shift lever 1. The side plates 31, 32 have holes 312, 322 formed in upper portions thereof and aligned to each other. A bolt 35 defining the right-to-left shaft X is inserted through the holes 312, 322 and through the collar 126 of the cross joint 12 to support the shift lever 1 together with the cross joint 12 rotatably in the front-to-rear direction relative to the stationary member 3. The side plate 31 is thicker than the other side plate 32, and has a front rib 310 formed as a curved wall that vertically extends along the front end thereof and protrudes outward, and a rear rib 310 formed by perpendicularly bending of the rear edge of the side plate 31. Thus, the side plate 31 has sufficiently greater rigidity and strength than the side plate 32. In addition, the side plate 31 has a cam hole forming the inhibiting cam 311.

The gate plate 2 is formed of a plastic material. The gate plate 2 is riveted to the base plate 30 at four positions, disposed between the two side plates 31, 32, relatively closer to the right side plate 32. As illustrated in detail by the plan view of FIG. 6, the gate plate 2 has an slot-like gate formed of an "I" pattern for the automatic shift mode and an "H" pattern for the manual shift mode. The "H" pattern is provided at the right side of the "I" pattern. A portion surrounding the "I" pattern gate becomes thicker toward the rear so that the gate pin 14 will not come off despite the turning of the shift lever 1 around the right-to-left shaft X.

Figure 9:
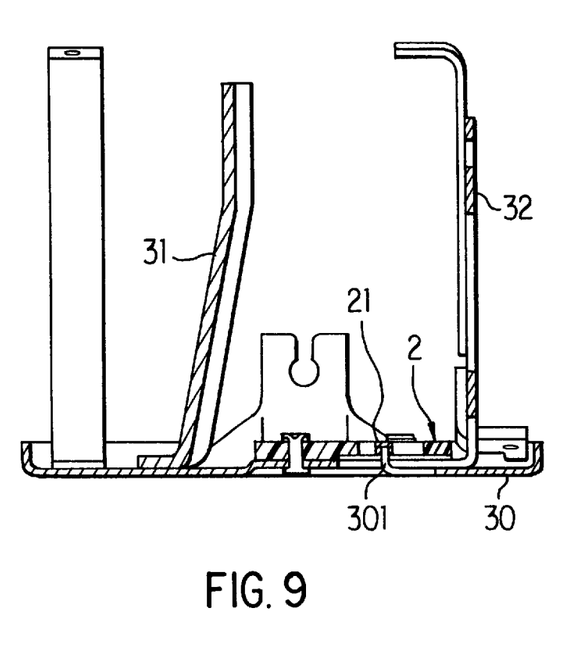
FIG. 9 is a sectional view taken along line 9—9 of FIG. 6.

Each of a pair of front-to-rear protruding portions 21 formed between a pair of front-to-rear elongated slots of the "H" pattern gate of the gate plate 2 and a right-to-left slot extending between the front-to-rear elongated slots has a groove formed on its bottom surface as illustrated in the sectional view of FIG. 9. Claws 301 of the base plate 30 formed by cutting and bending are forced into the grooves, thus providing reinforcing cores for the protruding portions 21, 21.

As shown in FIG. 5, the shift cable lever 5 is also provided on the right-to-left shaft X. The lever 5 is provided for mechanically transmitting range select motions of the shift lever 1 during the automatic shift mode, that is, front-to-rear turning, to the manual valve (not shown) of the automatic transmission. The shift cable lever 5 is a sector-shaped plate, and comprises a cable block 51 fixed to the inside surface of a free end portion thereof and a rectangular hole 50 formed slightly above the cable block 51. The rectangular hole 50 is provided for engagement with the protrusion 133 protruding from a lower part of the retainer 13. A hollow shaft is welded to an upper portion of the shift cable lever 5. A pair of right and left bushes 52 are fitted into the hollow shaft, and flanged collars 53 are fitted into the bushes 52. Although not shown in the drawings, a cable end is inserted in and fixed to the cable block 51. The cable is led through a hole of a support 302 protruding forward from the base plate 30, and the cable is connected to the operating mechanism of the manual valve.

Aligned on the right-to-left shaft X is the shift operation front-to-rear detent mechanism 6. The mechanism 6 is disposed outwardly from the right side plate 32 and comprises the detent lever 61 rotatably supported by the bolt 35 and the detent spring 62 formed of a leaf spring fixed to a bracket 323 of the side plate 32. The detent lever 61 comprises a switch operating arm 611 extending in a radial direction from a sleeve portion in which the bolt 35 is inserted, and a sickle-shaped detent cam arm 612. The switch operating arm 611 has a fork-shaped end. A retainer guide 613 is screwed to the periphery of a rectangular hole formed in a bent portion connecting to the sickle portion. A collar 614 and a bush 615 are fitted into the sleeve of the detent lever 61. The wave washers 616a, 616b and the quenched flat washers 617a, 617b are disposed on the ends of the sleeve. The sickle-shaped detent cam arm 612 has a cam 618 formed on its outer peripheral surface. The cam 618 has three troughs, and the central trough is deeper than the side troughs. The detent spring 62 has a roller 63 provided on the free end of a fork portion. The roller 63 is engaged with the cam 618. The base end of the detent spring 62 is screwed to the bracket 323 protruding outward from the side plate 32, with a spacer 64 disposed therebetween.

Figure 7:
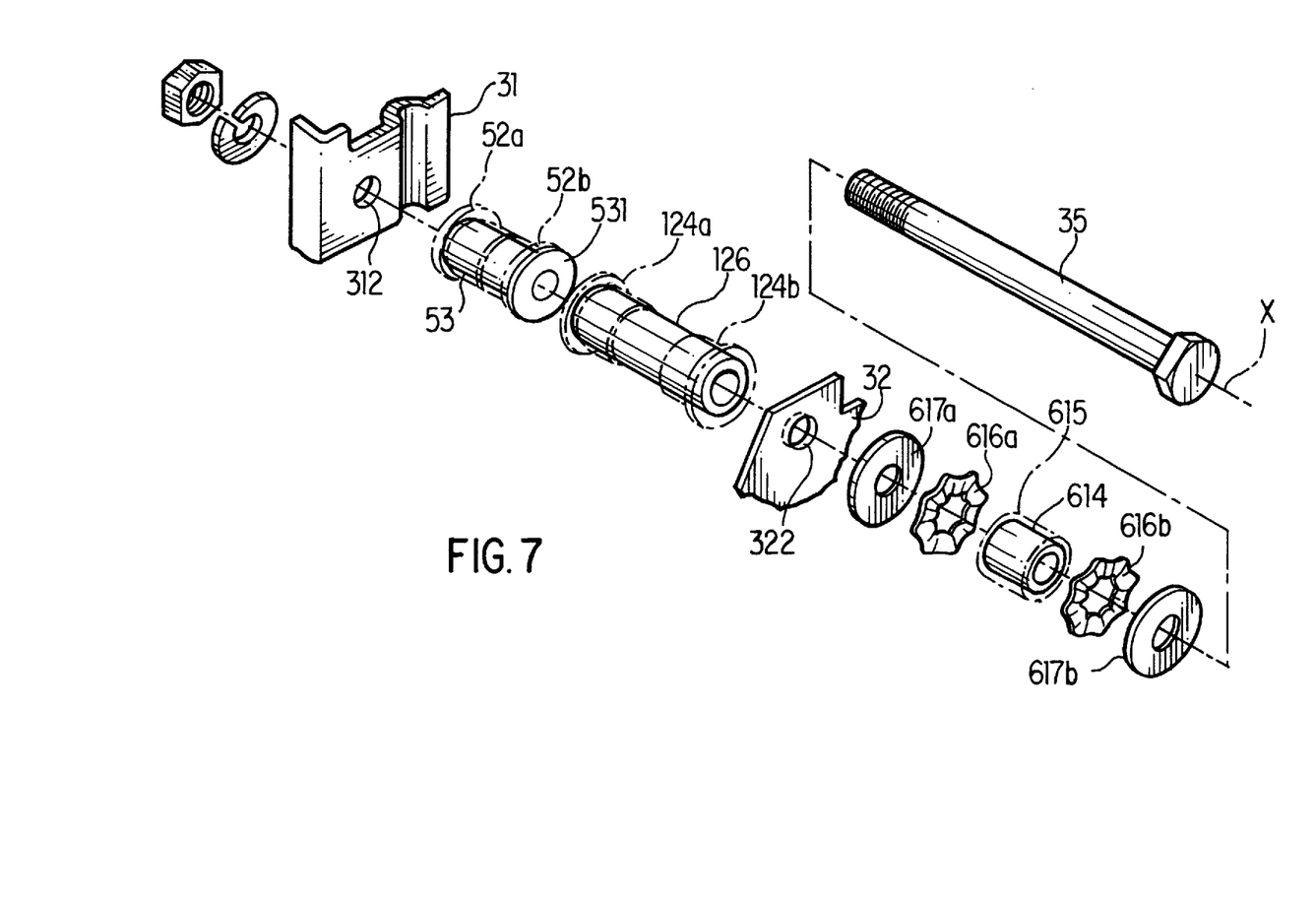
FIG. 7 is an exploded, perspective view illustrating the arrangement of various supporting members on the right-to-left shaft according to the embodiment.
Figure 8:
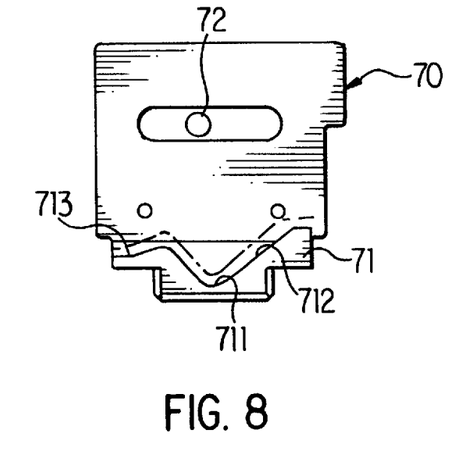
FIG. 8 is a front view of one of the switches and a detent cam integrated therewith according to the embodiment.

As shown in FIG. 1, the shift cable lever 5 and the cross joint 12 are disposed on the right-to-left shaft X, closer to the side plates 31, 32, respectively. The detent lever 61 is disposed outwardly from the side plate 32. The shift cable lever 5, the cross joint 12 and the detent lever 61 are supported to the side plates 31, 32 by fastening the bolt 35. When a nut is fastened to the side plate 31 side-end of the bolt 35 inserted from the detent lever 61 as shown in the enlarged exploded view of FIG. 7 illustrating relevant portions, the axial fastening force deforms the side plate 32 since the side plate 32 has a less strength than the side plate 31. With the deformation, the collars are drawn toward the side plate 31 and positioned by their abutting with each other in the axial direction, including the flanged collar 53 that rotatably supports the shift cable lever 5 with the bushes 52a, 52b disposed therebetween, the collar 126 that rotatably supports the cross joint 12 with the bushes 124a, 124b disposed therebetween, and the collar 614 that rotatably supports the side plate 32 and the detent lever 61 with the bush 615 disposed therebetween. The cross joint 12 and the shift cable lever 5 are kept apart from each other by the flange 531 of the flanged collar 53. The flange 531 also keeps the bush 52b apart from the bush 124a, eliminating the possibility of contact and friction caused rotation therebetween. This structure enables precise positioning of the component parts during assembly since the bushes, the collars and flanges, fitted to the component parts, abut and eliminate looseness. In addition, this structure substantially completely prevents the component parts from becoming loose or clattering during operation.

Similarly, the precise positioning of the component parts is achieved on the front-to-rear shaft Y, since the retainer 13 is fastened to the cross joint 12, and positioned without play or looseness as described above, by using the bolt 36 and a nut (unnumbered) together with the bushes and collars as shown in FIG. 4.

The right-to-left detent mechanism for the select operation comprises the detent cam 71 integrated or unitarily formed together with the casing of the switch 70 fixed to the retainer 13, and the plunger portion 129 of the cross joint 12. The detent cam 71 has a cam surface extending in the right-to-left direction as illustrated in detail in FIG. 8 (indicating the locus of the center of the semi-spherical end portion of the detent piston 127 by a broken line). The cam surface defines a central trough 711, a slope 712 extending to the left (to the right in FIG. 8), and a trough 713 formed at the right side (the left side in FIG. 8) of the central trough 711. The central trough 711 holds the select positions for the third and fourth speeds during the manual shift mode. The slope 712 provides for a function for returning from the first and second speeds to the neutral during the manual shift mode. The left side trough 713 provides for a holding function during the automatic shift mode.

The switch that transmits the operation of the shift lever 1 in the form of electric signal to the automatic transmission control device (ECT) will now be described. The switch 70 for detecting a select operation of the shift lever 1 is fixed to the retainer 13, and integrated with the detent cam 71, as illustrated in detail in FIG. 8. The switch 70 has an operating pin 72 that is fitted in the operating portion 120 formed in the rear side of the plunger portion 129 of the cross joint 12. The operating pin 72 is shifted between the right and left positions in accordance with rotation of the retainer 13 relative to the cross joint 12, so that the switch 70 transmits a signal indicating a stroke of the shift lever 1 in the right-to-left direction.

A switch 8 for detecting a shift operation of the shift lever 1 is fixed to the outside surface of the side plate 32 as shown in FIG. 5. An operating pin 82 of the switch 8 is fitted in the fork slot of the switch operating arm 611 of the detent lever 61. The operating pin 82 is shifted between the top and bottom positions by rotation of the detent lever 61. The switch 8 thus transmits a signal indicating a stroke of the shift lever 1 in the front-to-rear direction.

The operation of the shift device will now be described with respect to the shift modes.

(1) Range Select Operation in the Automatic Shift Mode:

In the "P" range, shown merely by its angle location in FIG. 2, the retainer 13 is in the rearmost rotational position around the right-to-left shaft X; the shift lever 1 is inclined to the right about the front-to-rear shaft Y (shown graphically by the symbol marked as the "D" range in FIG. 1); and the left protrusion 133 of the retainer 13 is thereby engaged with the hole 50 of the shift cable lever 5. In this position, the inhibit pin 41 is engaged with the rearmost trough of the cam hole 311 of the side plate 31 (see FIG. 2) and inhibited from moving; the detent piston 127 abuts the left trough 713 of the detent cam 71; and the gate pin 14 is in the rearmost position of the "I" pattern gate.

When the lock ring 45, disposed under the knob assembly 11, is raised while in the "P" range, the inhibit pin 41 is lifted to such a position that the pin 41 can move over the cam ridge. By subsequently moving the shift lever 1 backward, select operation for other gear positions or ranges of the automatic transmission mode are enabled. The inclining of the shift lever 1, to the left around front-to-rear shaft Y, is impossible in this situation since the gate plate 2 prevents the pin 14 from shifting in the right-to-left direction. By moving the shift lever 1 to the rearmost position through the "R" range position, the "N" range position (see FIG. 3), the shift lever 1 reaches the "D" range position. The gate pin 14 reaches the foremost position of the "I" pattern gate so that the shift lever 1 cannot be further moved backward. During this operation, the shift cable lever 5, cooperatively connected to the retainer 13, also turns with the bushes 52a, 52b idling around the fixed collar 53. The shift cable lever 5 thus transmits the motion, to the operating mechanism of the manual valve of the transmission via the cable (the cable, manual valve and transmission linkage are not shown as they are known to those skilled in the art), thereby shifting the range of the hydraulic pressure control unit of the automatic transmission. The clicking or restrained feel of this operation is suitably achieved by a conventional detent mechanism provided in the operation device of the manual valve of the automatic transmission.

(2) Switch from Automatic Shift Mode to Manual Shift Mode:

When the shift lever has reached the "D" range position, the shift lever 1 can be inclined to the left since the gate pin 14 has reached a connecting portion between the "I" pattern gate and the "H" pattern gate. To switch to the manual shift mode, the shift lever 1 is inclined to the left. The inclining of the shift lever to the left causes the retainer 13 to turn counterclockwise. The inhibit pin 41 comes out of the cam hole 311, and the left protrusion 133 of the retainer 13 comes out of the hole 50 in the shift cable lever 5. In turn, the right protrusion 134 of the retainer 13 engages with the hole of the retainer guide 613 of the detent lever 61. The shift lever 1 and the manual valve are thus disconnected, establishing the manual shift mode where the manual valve is fixed in the "D" range position.

After this operation, the movement of the shift lever 1 forward or backward causes the rotation of the detent lever 61, and the motion is detected by the switch 8. Clicking or restrained motion of the shift lever 1 is provided when the detent piston 127 is moved from the left trough 713 to the central trough 711. The engagement of the detent piston 127 with the central trough 711 restricts the position of the shift lever 1 within the third and fourth speed slot (hereinafter, referred to as "neutral position").

(3) Select Operation in Manual Shift Mode:

When the shift lever 1 is further inclined to the left from the neutral position, the retainer 13 further turns counterclockwise relative to the cross joint 12 so that the shift lever 1 reaches the first and second speed select slot. During this operation, the detent piston 127 is moved to the upward slope 712 of the cam 71 and thus applies a neutral returning force to the shift lever 1, thereby giving a resisting feel to the driver as in a conventional manually-shifted transmission. When the operating force in the select direction is removed, the shift lever 1 will be returned to and held in the neutral position without a failure.

(4) Shift Operation in Manual Shift Mode:

When the shift lever 1 is inclined to the left from the neutral position, the right protrusion 134 of the retainer 13 remains engaged with the hole of the retainer guide 613 of the detent lever 61. Therefore, subsequent forward turning of the shift lever 1, around the right-to-left shaft X, causes the operating pin 82 of the switch 8 to move down. Based on the operation of the switch 8, combined with the position of the operating pin 72 of the switch 70, the automatic transmission control apparatus (ECT) detects the forward turning of the shift lever as a shift to the first speed. Similarly, backward turning of the shift lever 1 is detected as a shift to the second speed on the basis of the upward movement of the operating pin 82 of the switch 8.

During this operation, the front-to-rear detent operates as follows. The detent lever 61 rotates so that the engagement of the detent cam arm 612 with the roller 63 of the detent spring 62 shifts in position. As the roller 63 moves over a ridge between troughs of the cam surface, a resisting feel is provided. As a feature of the shift device, the two wave washers 616 fastened to the opposite sides of the detent lever 61, by the bolt 35, so as to rotate together with the detent lever 61, are slidingly rotatable in a lubricated fashion relative to the quenched flat washers 617 disposed adjacent to the wave washers 617 but pressed against the fixed bolt. The sliding resistance therebetween presents a special resisting feel with viscous fluid-like resistance that is similar to the plunger sliding resistance occurring during a shift operation of a conventional manually-shifted transmission. The cross joint 12 is rotatable relative to the fixed collar 126, with the bushes 124a, 124b idling therebetween.

Shift to the third or fourth speed is performed by moving the shift lever 1 forward or backward from the neutral position. This turning operation of the shift lever 1 also causes the detent lever 6 to rotate, so that the switch 8 is operated as in the shift to the first or second speed. The operation of the front-to-rear detent mechanism during the shift to the third or fourth speed is substantially the same as in the shift to the first or second speed.

(5) Return to Automatic Shift Mode:

The return from the manual shift mode to the automatic shift mode is performed by inclining the shift lever 1 to the right from the neutral position. Since the various component parts are reversely operated as compared with the operation for the switch from the automatic shift mode to the manual shift mode, the operation of the component parts should be apparent and will not be described.

The detection signals from the switches 70,8 in the manual shift mode are input to an automatic transmission control apparatus (ECT). Based on the combination of the signals from the switches 70, 8, the apparatus determines which of the first to fourth speeds is selected. The apparatus processes the signals in substantially the same manner as the comparable apparatus in a conventional automatic transmission processes the speed-shift signals output during the "D" range in accordance with the throttle opening and vehicle speed. The processed signals are used for the control of the speed shift solenoid valve.

In the shift device described above, the rotational center shafts X, Y are defined in lengthwise intermediate portions of the shift lever 1, and the length of the shift lever 1 is reduced. The gate plate 2 is fixed to the base plate 30 provided at the a lowermost level with respect to the shift lever 1. Thus, the shift device provides good wrist-action shift feel. In addition, since the rotational center shaft Y is set above the rotational center shaft X, the select stroke is further reduced, thus improving the shift feel. It is desirable that the side plates 31, 32, serving as shaft bearings, be relatively deformable so that when fastened by the shaft bolt 35, the component parts thereby connected are fastened while the looseness or play between the component parts is eliminated. However, in an arrangement as described above, wherein the shift lever 1 and the gate plate 2 are separately disposed in the stationary member 3, that is, with respect to the base plate 30 and the side plates 31, 32, it may become impossible to precisely maintain the positions of the shift lever 1 and the gate plate 2 if the rigidity of the side plates 31, 32 is low. However, if the rigidity of the side plate 31,32 is excessively increased to prevent deformation, the fastening by the shaft bolt 35 will likely fail to eliminate looseness between the component parts and to suffer the problem of the clattering of the parts during operation.

In the above-described shift device, the side plate 31 is provided with the rib 310 to increase the rigidity of the plate 31 and the side plate 32 has a structure that provides flexibility. The shift device thus achieves improvements in positioning precision and the prevention of clattering of the component parts. Furthermore, because the claw 301, protruding from the base plate 30, is forced into the reverse side of the protrusions 21 of the gate plate 2 to reinforce the protrusions 21, the gate plate 2 can be formed of plastic, thus reducing weight.

In the arrangement where the rotational center shafts X, Y are established at higher levels, the rotational center shafts X, Y intersect the shift lever 1 in principle. However, since it is practically impossible to set the rotational center shafts X, Y to intersect the shift lever 1, through which the operating member of the inhibiting mechanism extends, it is necessary to offset the shift lever 1 from the rotational center shafts X, Y. Although this offset arrangement may complicate the inhibiting mechanism, the shift device according to the embodiment avoids complication of the inhibiting mechanism yet achieves sufficient precision by offsetting the shift lever 1 toward the side plate 31, that also serves as a strength member, and by forming the inhibiting cam 311 in the side plate 31.

In the shift device according to the embodiment, the front-to-rear detent mechanism 6 is disposed outwardly from the two shaft bearings for the right-to-left shaft; the wave washers 616a, 616b are disposed on the opposite ends of the mechanism 6; the quenched flat washers 617a, 617b are inserted in locations where the rotational parts abut non-rotational parts, so that the movable members for the manual shift mode and the movable members for the automatic shift mode are completely separated from each other. Therefore, the sliding friction between the wave washers 616a, 616b and the corresponding non-rotational portion is provided only during the manual shift mode. In addition, the insertion of the quenched flat washers 617a, 617b substantially prevents abrasion of the wave washers 616a, 616b contact-sliding portions to reduce friction changes over time. The embodiment also simplifies the structure and reduces costs.

Further, according to the embodiment, the shift cable lever 5 for the automatic shift mode, the front-to-rear detent mechanism 6 for the manual shift mode, and the cross joint 12 for both modes, which are all disposed on the right-to-left shaft X, are separated from each other by the fringe 531 of the collar 53 and one of the bearings. Therefore, the lever 5 cooperatively connected to the manual valve for the automatic shift mode and the detent lever 61 for the manual shift mode are supported while preventing dragging rotation therebetween, unless these members are connected by the left protrusion 133 or the right protrusion 134. The embodiment thus prevents their incorrect operation.

Furthermore, the cam 71 of the right-to-left detent mechanism, for defining the neutral position of the shift lever 1, and the switch 70, for detecting the select neutral position, are integrated and disposed on an element close to the shift lever 1, that is, the retainer 13. In addition, the plunger portion 129 for holding the shift lever to the neutral position and the operating portion 120 of the switch 70 are disposed inside the cross joint 12 that directly supports the retainer 13. This structure minimizes the accumulation of allowances between elements that affects the detection of the neutral position of the shift lever 1, thus providing for improvement of the detection precision of the select direction detecting switch mechanism 7 and omission of the positional adjustment.

In addition, since the right-to-left detent mechanism, the select direction detecting switch mechanism 7 and the neutral return mechanism for the "H" pattern of the manual shift mode are integrated with the shift lever as a single unit, the embodiment can reduce the number of man-hours for assembly and adjustment, the number of component parts, and simplifies the structure of the shift device.

Although the invention has been described with reference to what is presently considered to be a preferred embodiment, it is to be understood that the invention is not limited to the disclosed embodiment. To the contrary, the invention is intended to cover various modifications and equivalent arrangements included within the spirit and scope of the appended claims.

What is claimed is:

1. A vehicular automatic transmission shift device, comprising:
    a shift lever having an operating knob provided on a top portion of said shift lever;
    a gate plate that defines a shift pattern for an automatic shift mode and for a manual shift mode;
    a first rotational center shaft and a second rotational center shaft for allowing said shift lever to be rotated in a front-to-rear direction and rotated in a right-to-left direction, respectively, in accordance with the shift pattern of said gate plate;
    a cross joint supported so as to be freely rotatable around said first and second rotational center shafts;
    a retainer that is rotatable together with said cross joint around said first rotational center shaft and rotatable around said second rotational center shaft independently of said cross joint, wherein said shift lever is connected to said retainer, and said gate plate is disposed apart from said operating knob of said shift lever, with said first and second rotational center shafts positioned between said gate plate and said operating knob.

2. A vehicular automatic transmission shift device according to claim 1, wherein said second rotational center shaft is provided closer to said knob than said first rotational center shaft.

3. A vehicular automatic transmission shift device according to claim 1, further comprising a stationary member mounted on a vehicle body, wherein said gate plate is fixed to said stationary member and is at least partially reinforced by said stationary member that serves as a core.

4. A vehicular automatic transmission shift device according to claim 1, further comprising first and second side plates that bear said first rotational center shaft, and said first side plate has a greater strength than said second side plate.

5. A vehicular automatic transmission shift device according to claim 4, wherein said first side plate has a reinforcing rib.

6. A vehicular automatic transmission shift device according to claim 4, wherein said shift lever has a pin of an inhibiting mechanism, and said first side plate has a cam surface of said inhibiting mechanism.

7. A vehicular automatic transmission shift device according to claim 6, wherein said gate plate is disposed below said pin of said inhibiting mechanism.

8. A vehicular automatic transmission shift device according to claim 1, further comprising:
    a plurality of ranges in said automatic shift mode;
    a plurality of speeds in said manual shift mode;
    a front-to-rear detent mechanism for holding said shift lever to the shift position corresponding to a selected one of the speeds in accordance with rotation of said shift lever around said first rotational center shaft when said manual shift mode is selected; and resisting means for producing sliding resistance against rotation of said shift lever around said first rotational center shaft.

9. A vehicular automatic transmission shift device according to claim 8, wherein said front-to-rear detent mechanism comprises a cam rotatably supported around said first rotational center shaft and capable of rotating cooperatively with said shift lever when said manual shift mode is selected, and a spring supported by a stationary member and elastically contacting said cam, and said resisting means comprises at least one wave washer pressed against at least one end side of said rotatably supported cam.

10. A vehicular automatic transmission shift device according to claim 9, wherein said resisting means comprises at least one quenched flat washer on either side of said rotatably supported cam, and said at least one wave washer is disposed between said rotatably supported cam and a corresponding one said quenched flat washer.

11. A vehicular automatic transmission shift device according to claim 8, further comprising first and second side plates that bear said first rotational center shaft, and two collars disposed on said first rotational center shaft, and one of said two collars has a flange, and said two collars are disposed between said first and second side plates with said flange being located close to the other collar, wherein said front-to-rear detent mechanism and said resisting means are disposed on said first rotational center shaft and outwardly from said first and second side plates, and one of said collars rotatably supports a connecting mechanism for connecting to a manual valve of the automatic transmission, and the other one of said collars rotatably supports a connecting means for cooperating with rotation of said shift lever around said first rotational center shaft at all times, connecting with said connecting mechanism when said automatic shift mode is selected, and connecting with said front-to-rear detent mechanism when said manual shift mode is selected.

12. A vehicular automatic transmission shift device according to claim 1, further comprising:

a retainer that cooperates with rotation of said shift lever around said first rotational center shaft and rotation of said shift lever around said second rotational center shaft;

a cross joint that operates together with said retainer in cooperation with rotation of said shift lever around said first rotational center shaft and that does not cooperate with rotation of said shift lever around said second rotational center shaft;

a right-to-left detent mechanism for positioning said shift lever in a right-to-left direction in accordance with rotation of said shift lever around said second rotational center shaft, said right-to-left detent mechanism having a cam and a plunger portion associated with said cam; and a switch mechanism for detecting a position of said shift lever in accordance with rotation of said shift lever around said second rotational center shaft, said switch mechanism having a switch and an operating portion, wherein a first one of said cam and said plunger portion and a first one of said switch and said operating portion being integrally provided or unitarily formed, and being disposed on a first one of said retainer and said cross joint, and the second one of said cam and said plunger portion and the second one of said switch and said operating portion being integrally provided or unitarily formed and disposed on the second one of said retainer and said cross joint.

13. A vehicular automatic transmission shift device according to claim 12, further comprising:

an "I" pattern for setting select positions corresponding to a plurality of ranges in said automatic shift mode; and an "H" pattern provided adjacent to and connected to said "I" pattern, for setting shift positions corresponding to a plurality of speeds in said manual shift mode, wherein said right-to-left detent mechanism defining a position for switching over said "I" pattern and said "H" pattern, and neutral-returning said shift lever to a predetermined position when said shift lever is in said "H" pattern, and said switch mechanism detecting position of said shift lever in said "I" pattern, and a right hand-side position and a left hand-side position of said shift lever in said "H" pattern.

14. A vehicular automatic transmission shift device according to claim 13, wherein said retainer has a "U" shape, and said cross joint, said switch mechanism and said front-to-rear detent mechanism are disposed inside said retainer.

15. A vehicular automatic transmission shift device according to claim 14, wherein said cam and said switch are integrally provided or unitarily formed, and said cam and said switch are disposed on an inside bottom surface and an inside side surface, respectively, of said retainer, and said plunger portion and said operating portion are integrally provided or unitarily formed, and said plunger portion and said operating portion are disposed in a lower portion and a central portion, respectively, of said cross joint, and said switch has a pin that slides in cooperation with said operating portion in accordance with rotation of said shift lever around said second rotational center shaft.

* * * * *